US011146389B2

(12) United States Patent
Dambal et al.

(10) Patent No.: US 11,146,389 B2
(45) Date of Patent: Oct. 12, 2021

(54) METHOD AND APPARATUS FOR ENSURING INTEGRITY OF KEYS IN A SECURE ENTERPRISE KEY MANAGER SOLUTION

(71) Applicant: DELL PRODUCTS, LP, Round Rock, TX (US)

(72) Inventors: Sanjeev Dambal, Austin, TX (US); Chandrashekar Nelogal, Round Rock, TX (US); Karthikeyan Rajagopalan, Austin, TX (US); Texas Roemer, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 224 days.

(21) Appl. No.: 16/559,868

(22) Filed: Sep. 4, 2019

(65) Prior Publication Data
US 2021/0067323 A1 Mar. 4, 2021

(51) Int. Cl.
H04L 9/08 (2006.01)
H04L 9/32 (2006.01)

(52) U.S. Cl.
CPC ............ H04L 9/083 (2013.01); H04L 9/0861 (2013.01); H04L 9/3226 (2013.01)

(58) Field of Classification Search
CPC ..... H04L 9/083; H04L 9/3226; H04L 9/0861; H04L 9/3242; H04L 9/0897
See application file for complete search history.

(56) References Cited

U.S. PATENT DOCUMENTS

| 9,740,867 | B2 | 8/2017 | Nelson et al. |
| 10,103,882 | B2 | 10/2018 | Stufflebeam |
| 10,169,602 | B2 | 1/2019 | Gupta et al. |
| 2008/0260156 | A1* | 10/2008 | Baba ................ G06F 21/88 380/277 |

(Continued)

OTHER PUBLICATIONS

Dambal et al., "Mechanism to Secure Side Band Communication Between Service Processor and an End Point," Pending U.S. Appl. No. 16/431,944, filed Jun. 5, 2019, 20 pgs.

Primary Examiner — Henry Tsang
(74) Attorney, Agent, or Firm — Larson Newman, LLP

(57) ABSTRACT

An information handling system includes a first node configured to generate a random alphanumeric string, to receive a cipher text and a key from an enterprise key management server, and to decrypt the cipher text using the key and an algorithm to generate a first decrypted value. The first node compares the random alphanumeric string with the first decrypted value to verify the key that is received at the first node. A second node receives the cipher text, the key, and the algorithm from the first node in response to the first decrypted value matching the random alphanumeric string. The second node decrypts the cipher text using the key and the algorithm to generate a second decrypted value, and the first node compares the second decrypted value with the random alphanumeric string to verify the key that is received at the second node. A self-encrypting drive receives the key from the second node in response to the second decrypted value matching the random alphanumeric string, and uses the key upon authentication of the key by the second node.

20 Claims, 7 Drawing Sheets

(56) References Cited

U.S. PATENT DOCUMENTS

| | | | |
|---|---|---|---|
| 2011/0289178 A1* | 11/2011 | Ittah | G06F 21/79 |
| | | | 709/213 |
| 2012/0124386 A1* | 5/2012 | Lin | G06F 21/6218 |
| | | | 713/182 |
| 2013/0145160 A1* | 6/2013 | Bursell | G06F 21/6218 |
| | | | 713/168 |
| 2017/0288867 A1* | 10/2017 | Collier | G06F 21/31 |

\* cited by examiner

METHOD AND APPARATUS FOR ENSURING INTEGRITY OF KEYS IN A SECURE ENTERPRISE KEY MANAGER SOLUTION

FIELD OF THE DISCLOSURE

This disclosure generally relates to information handling systems, and more particularly relates to method and apparatus for ensuring integrity of keys in a secure enterprise key manager (SEKM) solution.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

An information handling system includes a first node to generate a random alphanumeric string, to receive a cipher text and a key from an enterprise key management server, and to decrypt the cipher text using the key and an algorithm to generate a first decrypted value. The first node may compare the random alphanumeric string with the first decrypted value to verify the key that is received at the first node. A second node receives the cipher text, the key, and the algorithm from the first node in response to the first decrypted value matching the random alphanumeric string. The second node may decrypt the cipher text using the key and the algorithm to generate a second decrypted value, and the first node may compare the second decrypted value with the random alphanumeric string to verify the key that is received at the second node. A self-encrypting drive receives the key from the second node in response to the second decrypted value matching the random alphanumeric string, and uses the key upon authentication of the key by the second node.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings.

Figure 1:
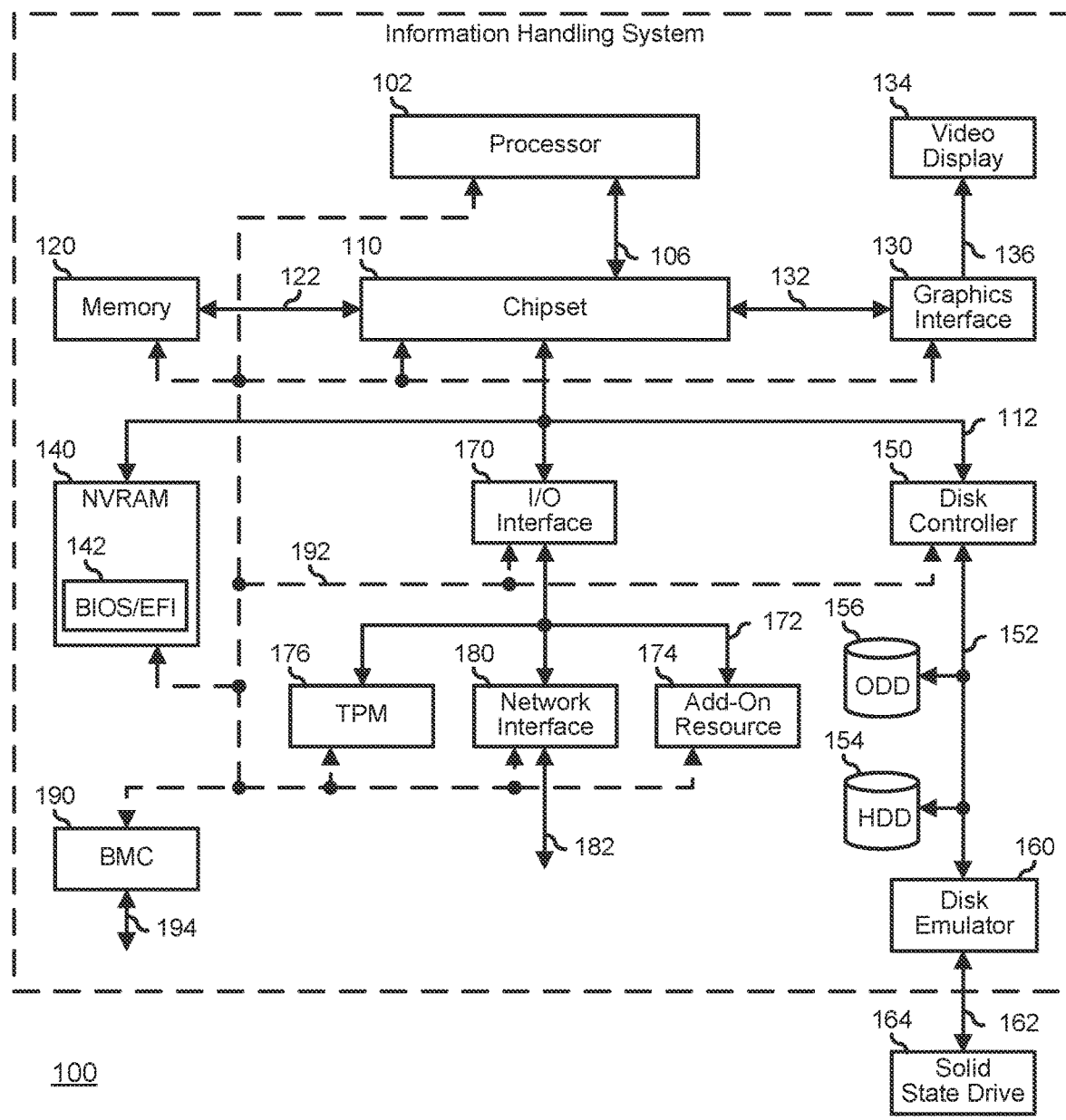
FIG. 1 is a block diagram illustrating an information handling system according to an embodiment of the present disclosure.

FIG. 1 illustrates an embodiment of an information handling system 100 including a processor 102, processor interface 106, chipset 110, memory 120, graphics adapter 130 connected to video display 134, non-volatile RAM (NV-RAM) 140 that includes a basic input and output system/extensible firmware interface (BIOS/EFI) module 142, disk controller 150, hard disk drive (HDD) 154, optical disk drive (ODD) 156, disk emulator 160 connected to solid state drive (SSD) 164, an input/output (I/O) interface 170 connected to an add-on resource 174, a trusted platform module (TPM) 176, a network interface device 180, and a baseboard management controller (BMC) 190. The information handling system 100 can be a personal computer, a laptop computer, a smart phone, a tablet device or other consumer electronic device, a network server, a network storage device, a switch router or other network communication device, or any other suitable device and may vary in size, shape, performance, functionality, and price. The elements depicted in information handling system 100 may not be representative of all elements of information handling systems in general. Moreover some elements as depicted in information handling system 100 may not be applicable to all information handling systems as described in the present embodiments.

Chipset 110 represents an integrated circuit or group of integrated circuits that manages data flow between the processor 102 and the other elements of information handling system 100. In a particular embodiment, chipset 110 represents a pair of integrated circuits, such as a north bridge component and a south bridge component. In another embodiment, some or all of the functions and features of chipset 110 are integrated with one or more of processor 102. Memory 120 is connected to chipset 110 via a memory interface 122. An example of memory interface 122 includes a Double Data Rate (DDR) memory channel, and memory 120 represents one or more DDR Dual In-Line Memory Modules (DIMMs). In a particular embodiment, memory interface 122 represents two or more DDR channels. In another embodiment, one or more of processors 102 include memory interface 122 that provides a dedicated memory for the processors. A DDR channel and the connected DDR DIMMs can be in accordance with a particular DDR standard, such as a DDR3 standard, a DDR4 standard, a DDR5 standard, or the like. Memory 120 may further represent various combinations of memory types, such as Dynamic Random Access Memory (DRAM) DIMMs, Static Random Access Memory (SRAM) DIMMs, non-volatile DIMMs (NV-DIMMs), storage class memory devices, Read-Only Memory (ROM) devices, or the like.

Graphics adapter 130 is connected to chipset 110 via a graphics interface 132, and provides a video display output 136 to a video display 134. An example of a graphics interface 132 includes a peripheral component interconnect-express interface (PCIe) and graphics adapter 130 can include a four lane (x4) PCIe adapter, an eight lane (x8) PCIe adapter, a 16-lane (x16) PCIe adapter, or another configuration, as needed or desired. In a particular embodiment, graphics adapter 130 is provided on a system printed circuit board (PCB). Video display output 136 can include a digital video interface (DVI), a high definition multimedia interface (HDMI), DisplayPort interface, or the like. Video display 134 can include a monitor, a smart television, an embedded display such as a laptop computer display, or the like.

NV-RAM 140, disk controller 150, and I/O interface 170 are connected to chipset 110 via I/O channel 112. An example of I/O channel 112 includes one or more point-to-point PCIe links between chipset 110 and each of NV-RAM 140, disk controller 150, and I/O interface 170. Chipset 110 can also include one or more other I/O interfaces, including an Industry Standard Architecture (ISA) interface, a Small Computer Serial Interface (SCSI) interface, an Inter-Integrated Circuit (I$^2$C) interface, a System Packet Interface (SPI), a Universal Serial Bus (USB), another interface, or a combination thereof. NV-RAM 140 includes BIOS/EFI module 142 that stores machine-executable code (BIOS/EFI code) that operates to detect the resources of information handling system 100, to provide drivers for the resources, to initialize the resources, and to provide common access mechanisms for the resources.

Disk controller 150 includes a disk interface 152 that connects the disk controller to HDD 154, to ODD 156, and to disk emulator 160. Disk interface 152 may include an integrated drive electronics (IDE) interface, an advanced technology attachment (ATA) such as a parallel ATA (PATA) interface or a serial ATA (SATA) interface, a SCSI interface, a serial attached SCSI (SAS) interface, a USB interface, a proprietary interface, or a combination thereof. Disk emulator 160 permits a solid-state drive (SSD) 164 to be connected to information handling system 100 via an external interface 162. An example of external interface 162 includes a USB interface, an IEEE 1394 (Firewire) interface, a proprietary interface, or a combination thereof. Alternatively, SSD 164 can be disposed within information handling system 100.

I/O interface 170 includes a peripheral interface 172 that connects I/O interface 170 to add-on resource 174, to TPM 176, and to network interface 180. Peripheral interface 172 can be the same type of interface as I/O channel 112, or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral channel 172 when they are of a different type. Add-on resource 174 can include a data storage system, an additional graphics interface, a NIC, a sound/video processing card, another add-on resource, or a combination thereof. Add-on resource 174 can be on a main circuit board, a separate circuit board or an add-in card disposed within information handling system 100, a device that is external to the information handling system, or a combination thereof.

Network interface device 180 represents a network communication device disposed within information handling system 100, on a main circuit board of the information handling system, integrated onto another element such as chipset 110, in another suitable location, or a combination thereof. Network interface device 180 includes a network channel 182 that provides an interface to devices that are external to information handling system 100. In a particular embodiment, network channel 182 is of a different type than peripheral channel 172 and network interface 180 translates information from a format suitable to the peripheral channel to a format suitable to external devices. In a particular embodiment, network interface device 180 includes a NIC or host bus adapter (HBA), and an example of network channel 182 includes an InfiniBand channel, a fiber channel, a gigabit Ethernet channel, a proprietary channel architecture, or a combination thereof. Network channel 182 can be connected to an external network resource (not illustrated). The network resource can include another information handling system, a data storage system, another network, a grid management system, another suitable resource, or a combination thereof.

BMC 190 is connected to multiple elements of information handling system 100 via one or more management interface 192 to provide out of band monitoring, maintenance, and control of the elements of the information handling system. As such, BMC 190 represents a processing device different from the processor 102, which provides various management functions for information handling system 100. In an embodiment, BMC 190 may be responsible for granting access to an external device that may establish control of the elements to implement power management, cooling management, storage management, and the like. The BMC may communicate with the external server using a network interface 194.

In an embodiment, the BMC implements an integrated remote access controller (iDRAC) that operates to monitor and maintain system firmware, such as code stored in BIOS/EFI module 142, option ROMs for graphics interface 130, disk controller 150, add-on resource 174, network interface 180, or other elements of information handling system 100, as needed or desired. In particular, BMC 190 includes the network interface 194 that can be connected to a remote management system to receive firmware updates, as needed or desired. Here, BMC 190 receives the firmware updates, stores the updates to a data storage device associated with the BMC, transfers the firmware updates to NV-RAM of the device or system that is the subject of the firmware update, thereby replacing the currently operating firmware associated with the device or system, and reboots information handling system, whereupon the device or system utilizes the updated firmware image.

Figure 2:
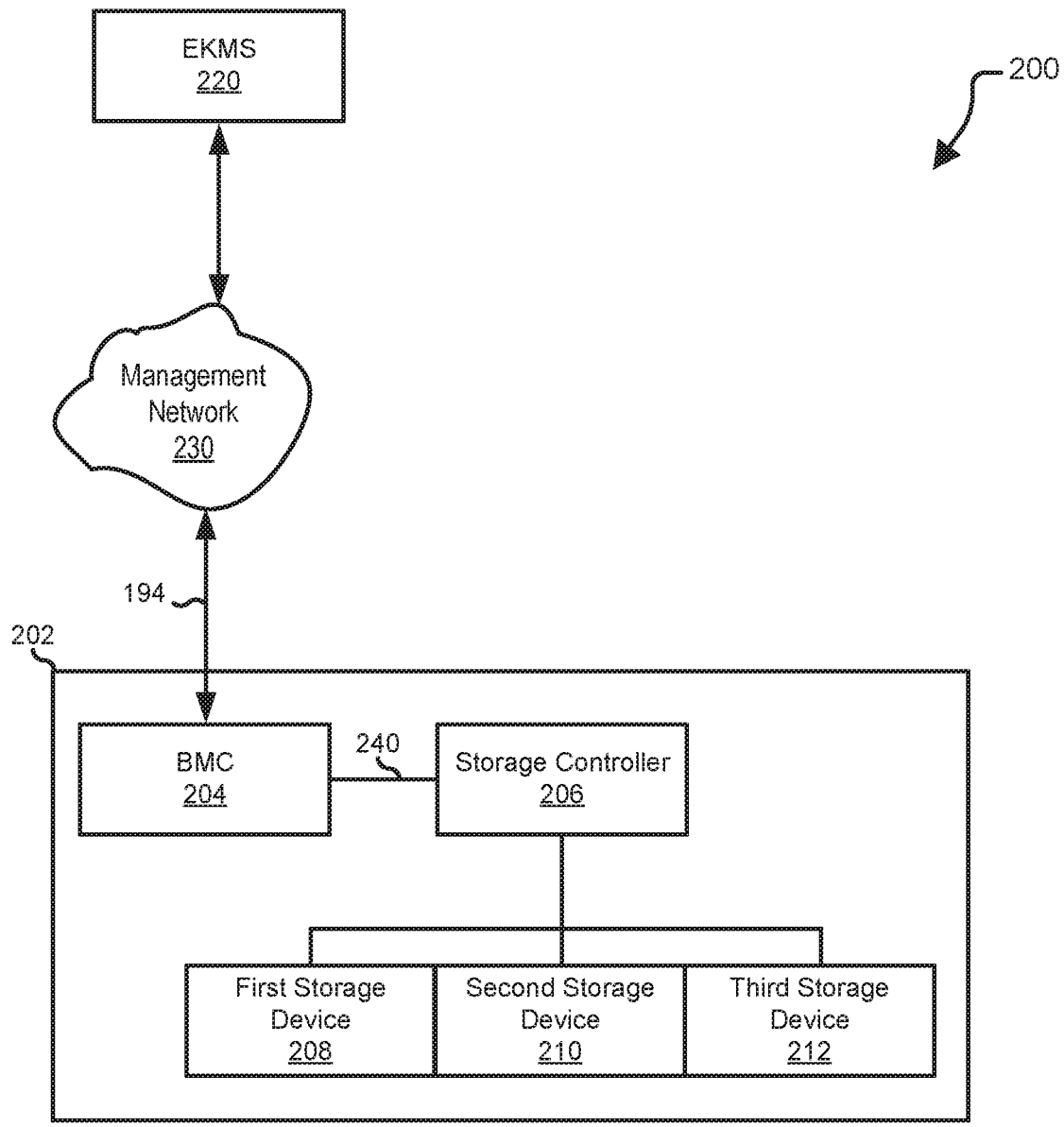
FIG. 2 is a schematic diagram illustrating an exemplary data storage system according to an embodiment of the present disclosure.

FIG. 2 shows an exemplary data storage system 200 that implements a SEKM solution. The SEKM solution includes a centralized key management to securely access storage devices in a server. The centralized key management can include the server fetching a key from an external server such as an enterprise key management server, and the server using the fetched key to lock or unlock access to the storage devices. In the SEKM solution, the enterprise key management server generates the keys that may be fetched by different servers to access their respective storage devices. As the key traverses from the enterprise key management server to a target storage device of a particular server, an incorrect key can be received by the target storage device. As such, there is a need to improve the SEKM solution to make sure that the key at the target storage device or at any node in a key traversal path is the same key that is being fetched from the enterprise key management server. The node in the key traversal path can include the target storage device or other terminal device that may receive the fetched key. The key traversal path may include a link between the enterprise key management server and the target storage device.

The data storage system 200 can include a network attached storage 202. The network attached storage 202 can include a BMC 204 and a storage controller 206. Additionally, the network attached storage 202 can include storage devices 208-212. In various embodiments, each of the storage devices 208-212 can be self-encrypting drives. Self-encrypting drives provide hardware-based encryption of data that may be stored on the self-encrypting drive. Access to the data can be dependent on access to the key. The key can include a combination of a key identification and a key value for locking or unlocking access to the storage devices. In a large network that employs the SEKM solution, key management can be centralized using an enterprise key management server 220. Enterprise key management server 220 can manage keys for various devices including self-encrypting drives, such as self-encrypting drives located throughout a data center.

The enterprise key management server 220 can communicate with the BMC 204 through a network 230. Additionally, the BMC 204 can communicate with the storage controller 206 through a sideband interface 240, such as an I²C interface. The BMC 204, storage controller 206, and the sideband interface 240 are similar to the BMC 190, disk controller 150, and the management interface 192, respectively. In various embodiments, communication between the BMC 204 and storage controller 206 can utilize management component transport protocol over the sideband interface 240. As such, the communication may be unencrypted and/or unauthenticated. As sideband interface 240 is in the key traversal path between the enterprise key management server 220 and the storage controller 206, it can be desirable to provide at least an authentication of the key that is received by the storage controller through the sideband interface. The provided authentication may ensure the integrity of the key for the SEKM solution.

At SEKM mode and upon reboot of the network attached storage 202, the storage controller 206 may detect the storage devices 208-212 to be self-encrypting drives that require keys from the enterprise key management server 220 to lock or unlock. SEKM mode in the SEKM solution includes an operation where the key is created and fetched from the external server such as the enterprise key management server 220. SEKM mode is implemented to protect the data in cases where the server is stolen, lost, or moved to another data center. With the detected self-encrypting drives, the storage controller 206 can send a message to the BMC 204 requesting for the key to lock or unlock the self-encrypting drives. In response to the received key request from the storage controller 206, the BMC 204 sends a separate command to the enterprise key management server 220 requesting a creation of the key. The enterprise key management server 220 will then create and send a key identification to the BMC 204. In this stage, the BMC 204 may be referred to as a receiving node that is located along the key traversal path between the enterprise key management server 220 and the storage devices 208-212.

To ensure the integrity of the key to be received by the BMC 204 as the receiving node, the BMC 204 generates and sends a random alphanumeric string to the enterprise key management server 220. The random alphanumeric string can include a combination of numbers and alphabets. The BMC 204 can also identify and send an algorithm including the received key identification to the enterprise key management server 220. The identified algorithm, for example, can be used by the enterprise key management server 220 for encrypting of the random alphanumeric string. The enterprise key management server 220 will then use the key identification to find the corresponding key value, and to generate the key. In an embodiment, the enterprise key management server 220 uses the generated key and the received algorithm to encrypt the random alphanumeric string in order to generate a cipher text.

After generating the cipher text, the enterprise key management server 220 sends the cipher text including the generated key to the BMC 204. At the BMC 204, the received key may be an incorrect key due to incorrect transmission, modification of the key during decoding by the BMC, due to direct modification by other sources such as malicious code or application, or a combination thereof. In this regard, the BMC 204 decrypts the cipher text using the key and the indicated algorithm, and the BMC compares the decrypted cipher text with the random alphanumeric string that the BMC initially generated. In response to a matching decrypted cipher text and random alphanumeric string, the received key at the BMC 204 is verified. With the verified key, the BMC 204 can apply the key to another node such as the storage controller 206. In this case, the BMC 204 is now treated as a transmitting node while the storage controller 206 is referred to as the immediate receiving node in the key traversal path. The BMC 204 as the transmitting node can perform authentication of the key at the storage controller 206.

For example, the BMC transmits the cypher text to the storage controller 206. In this example, the BMC 204 further sends the key that it received from the enterprise key management server 220, and communicates/indicates the algorithm that can be used by the receiving storage controller 206 to decrypt the cipher text. The key in this case can be a symmetric key that includes the same key to be used for encryption or decryption purposes. After decryption of the cipher text by the storage controller 206, the storage controller sends the decrypted cipher text to the BMC 204, and the BMC matches the decrypted cipher text with the random alphanumeric string that the BMC initially generated. In response to a matching decrypted cipher text and random alphanumeric string, the received key at the signal controller 206 is authentic and the BMC 204 can now send a command to the storage controller to apply the key for locking or unlocking of the storage devices 208-212. Furthermore, the BMC 204 can discard the cipher text and the key, and the BMC can record the verification of the key at the storage controller 206.

In a case where the decrypted cipher text that is provided by the storage controller 206 is not equal to the random alphanumeric string, the BMC 204 sends a notice to the storage controller 206 that it received an incorrect key. The BMC 204 further logs or records this incident of incorrect key that was received by the storage controller 206. For large networks, the recording of the verified key or the incorrect key facilitates tracing of key status on each node along the key traversal path.

The storage devices 208-212 can include self-encrypting non-volatile memory express (NVMe) drives. In an embodiment, the self-encrypting NVMe drives can form a redundant array of independent drives (RAID) array with the storage controller 206 being configured as a RAID controller. In other embodiments, the storage devices 208-212 can include self-encrypting HDDs that utilize the SAS interface or the SATA interface. The number of storage devices presented is for ease of illustration and different numbers of storage devices may be utilized in other embodiments.

Although the data storage system 200 above is presented as a cloud network, the data storage system can be a rack server with the enterprise key management server 220 as a top-of-rack server, and the network attached storage 202 being one of server modules within the rack server. In this case, each one of the server modules includes the information handling system that is directly connected to the top-of-rack server.

Figure 3:
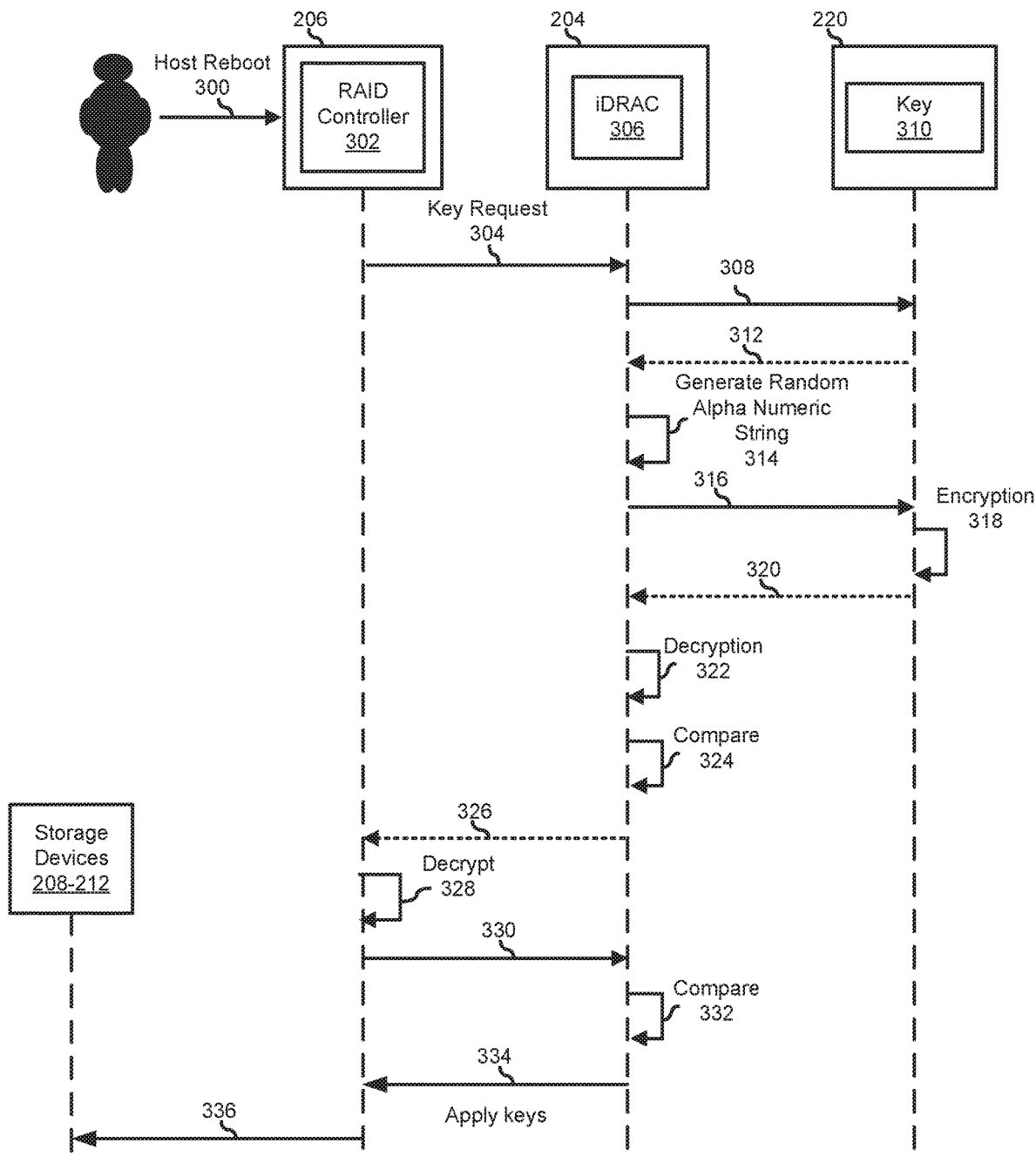
FIG. 3 is a sequence diagram of a method for authenticating a key in the data storage system according to an embodiment of the present disclosure.

FIG. 3 shows a diagram for authenticating the key at each receiving node during a reboot operation in the information handling system. The authentication diagram can be implemented to verify the integrity of the key at different receiving nodes such as the BMC 204, storage controller 206, and the storage devices 208-212. Only three receiving nodes are shown for simplicity, and additional nodes such as additional storage controllers in the same or a different server may be added without affecting the embodiment described herein. In various embodiments, the key may be incorrectly received at one or more of the receiving nodes. Accordingly, the verification of the key at each of the receiving node may be implemented to avoid use of the incorrect key in the SEKM solution. The incorrect key includes a different key identification and/or invalid actual key values as compared to the key that was generated by the enterprise key management server.

When a user initiates a host reboot 300 on the information handling system, the storage controller such as a RAID controller 302 may detect the storage devices 208-210 to include self-encrypting drives. The self-encrypting drives are locked when the information handling system is powered OFF, and the RAID controller 302 may need the key to unlock upon reboot. In this case, the RAID controller 302 may send a key request 304 to the BMC 204 through a message or command. The key request 304 may be sent through the sideband interface 240 that connects the storage controller 206 to the BMC 204.

In response to the received key request 304 from the RAID controller 302, the BMC such as an iDRAC 306 can communicate with the enterprise key management server 220 using, for example, a standard key management interface protocol (KMIP) CREATE command. The KMIP CREATE command may enable communication between different kind of servers such as the enterprise key management server 220 and the network attached storage 202. The KMIP CREATE command is an application interface that is designed to securely fetch the key from the different kinds of servers. For example, the iDRAC 306 sends a KMIP CREATE command 308 that includes a request for the enterprise key management server 220 to create the key. Based from the received KMIP CREATE command 308, the enterprise key management server 220 creates a key 310 that can include the key identification and key values. In an embodiment, the enterprise key management server 220 transmits 312 the key identification to the iDRAC 306. In this embodiment, the key values portion of the key is retained by the enterprise key management server 220.

With the received key identification, the iDRAC 306 may be configured to generate a random alphanumeric string 314, and to identify a particular algorithm on how to encrypt the random alphanumeric string with the use of the key 310. The iDRAC 306 may send to the enterprise key management server 220 an encryption request 316 including the generated alphanumeric string 314, the identified algorithm, and the key identification. The encryption request 316 may include a command for encryption of the generated alphanumeric string 314 by the enterprise key management server 220. In various embodiments, the key identification may be used by the enterprise key management server 220 to find the corresponding key value, and to generate the key 310.

The enterprise key management server 220 may include hardware circuit that performs an encryption 318 of the alphanumeric string 314 using the key 310 and the received algorithm. The encryption 318 may generate a cipher text 320 that includes an encrypted alphanumeric string. The enterprise key management server 220 sends the cipher text 320 and the generated key 310 to the iDRAC 306 as part of the response to the encryption request 316. In various embodiments, the iDRAC 306 decrypts 322 the cipher text 320 using the key 310, and the iDRAC compares 324 the decrypted cipher text with the random alphanumeric string that the iDRAC initially generated. In a case where the decrypted cipher text matches with the random alphanumeric string 314, then the key 310 that was received by the iDRAC is authentic. In this case, the iDRAC 306 as the receiving node may record this authentication, and the iDRAC can forward the key to an immediate node such as the RAID controller 302.

In order to authenticate the key 310 that will be received by the RAID controller 302, the iDRAC 306 may send a new command 326 to the RAID controller. The new command 326 may include the cipher text 320, key 310, and the algorithm. Here, the new command 326 may further request the RAID controller 302 to decrypt the cipher text 320 using the key 310 and the indicated algorithm, and to send back the decrypted cipher text to the iDRAC 306. For example, the RAID controller 302 receives the new command 326, and the RAID controller decrypts 328 the cipher text 320 using the key 310 and the algorithm. In this example, the RAID controller 302 sends 330 the decrypted cipher text to the iDRAC 306, and the iDRAC compares 332 the decrypted cipher text to the random alphanumeric string 314.

In a case where the decrypted cipher text from the RAID controller 302 matches with the random alphanumeric string, then the key 310 that was received by the RAID controller is authentic. In this case, the iDRAC 306 may record this authentication of the key at the RAID controller as a receiving node. The iDRAC further sends a go signal 334 to the RAID controller 302 to apply the key 310 in locking or unlocking of the storage devices 208-212. The go signal 334 may be used by the RAID controller 302 as a signal for sending 336 the key 310 to the storage device 208-212 that may be configured to form a RAID array. Furthermore, the iDRAC 306 may discard the cipher text 320 and the key 310, after the authentication of the key at the RAID controller 302 unless the iDRAC will further use these parameters to authenticate the key to be received by a different node.

In various embodiments, the RAID controller 302 may use the cipher text 320, key 310, and the algorithm to authenticate the key that will be received by an immediate node such as the storage devices 208-212 or another storage controller. Thus, by having every node on the key traversal path decrypt the cipher text using the key and the indicated algorithm, and reporting the decrypted value back to the previous node for validation of the received key, the integrity of the key as it travels from one node to another node is authenticated. Additionally, each node can log or record the authentication results to provide information to an end user for purposes of trouble shooting the node or nodes that received the incorrect key.

Figure 4:
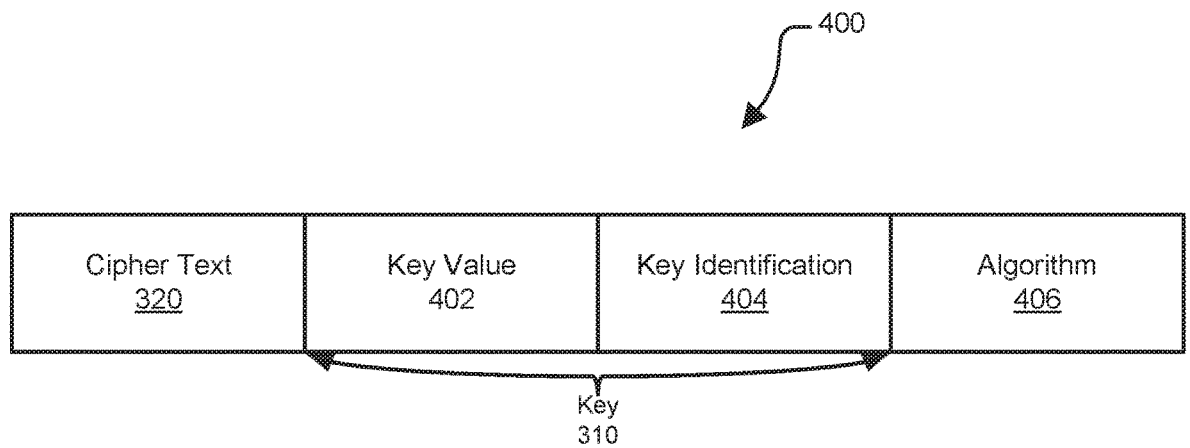
FIG. 4 is a block diagram illustrating an exemplary data format according to an embodiment of the present disclosure.

FIG. 4 is an exemplary data packet 400 that is communicated by one node to an immediate node over a sideband interface. The data packet 400 can include the cipher text 320, the key 310 including a key value 402 and a key identification 404, and algorithm 406. The key 310 may include symmetric encryption key, and the algorithm can use the symmetric encryption key for encryption and decryption purposes. Furthermore, the BMC 204 may identify the algorithm 404 to be used for encryption and decryption purposes. The algorithm 404, for example, may be stored in the memory 120 of the information handling system.

Figure 5:
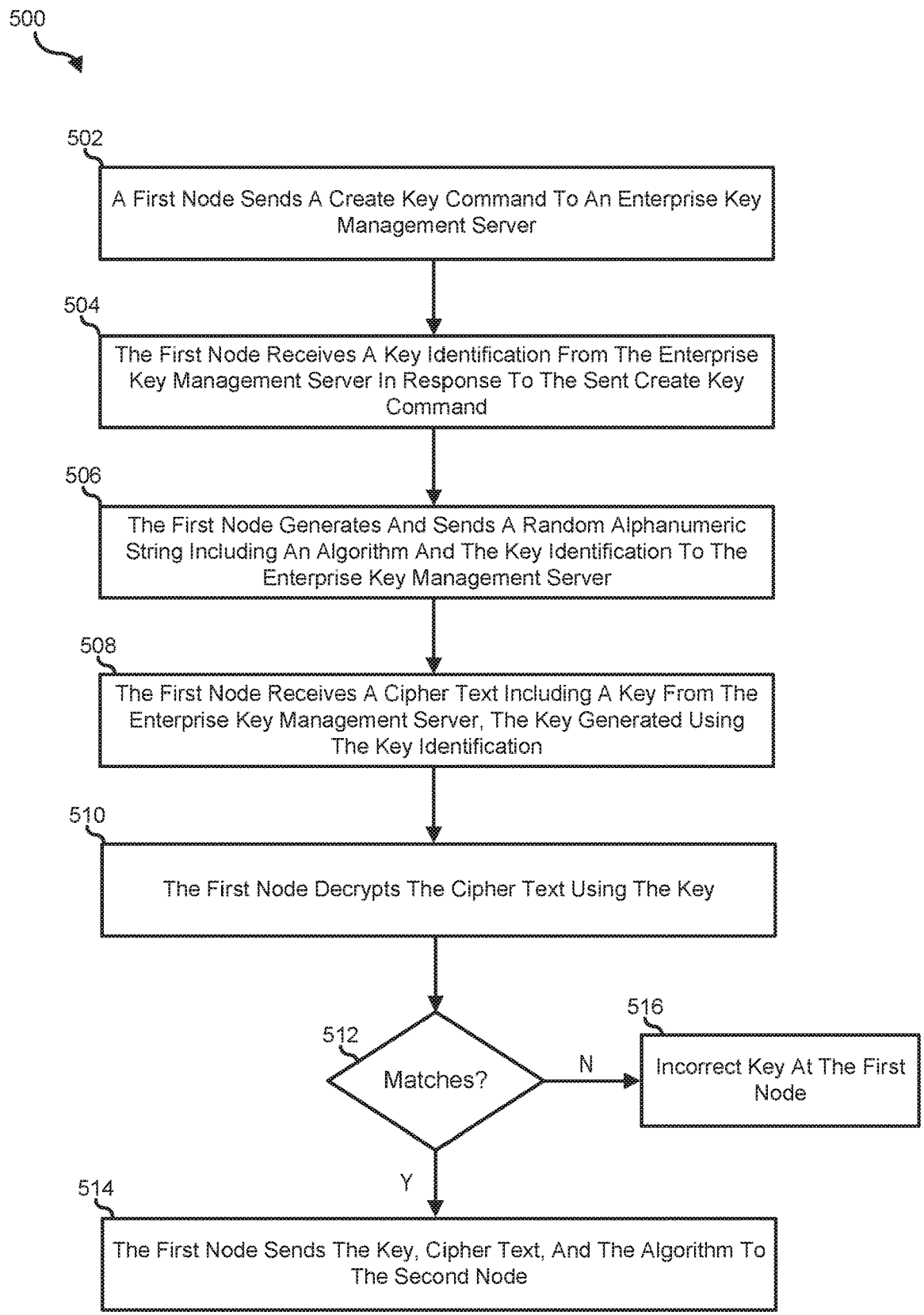
FIGS. 5-7 are flow charts showing a method of verifying the key at different receiving nodes in the data storage system according to an embodiment of the present disclosure.
Figure 6:
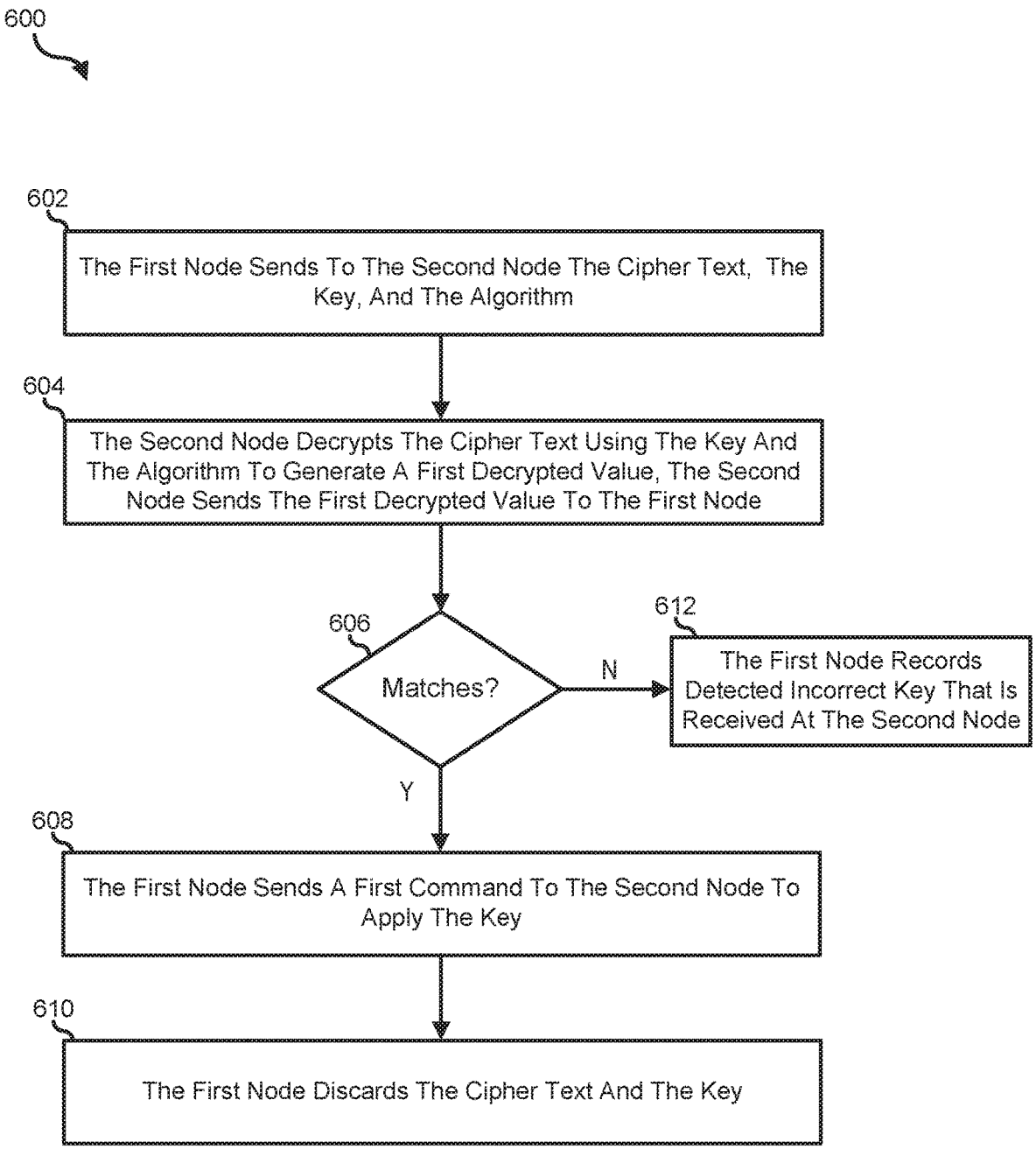
Figure 7:
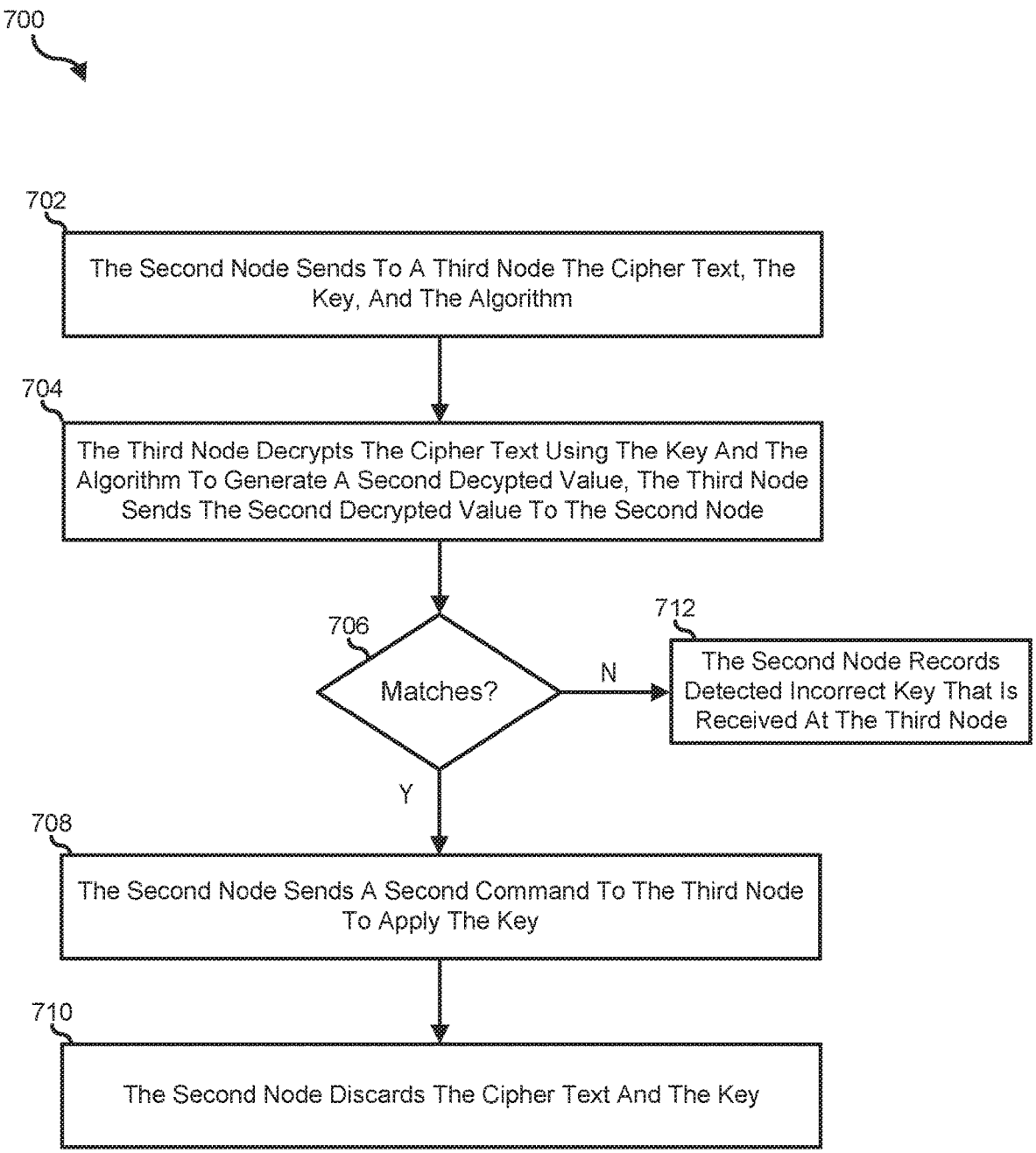

FIGS. 5-7 show a method of verifying the received key in each receiving node in the information handling system that implements the SEKM solution. At block 502, a first node sends a create key command to the enterprise key management server. For example, the information handling system such as the network attached storage 202 includes the BMC 204 and the storage controller 206 as a first node and a second node, respectively. In this example and during reboot operation at SEKM mode, the second node detects the storage controller 206 to include self-encrypting drives. In response to this detection, the second node sends a key request to the first node. With the received key request from the second node, the first node sends the KMIP CREATE command to the enterprise key management server 220.

At block 504, the first node receives a key identification from the enterprise key management server in response to the sent key request. For example, the enterprise key management server 220 generates the key identification 404 in response to receiving of the KMIP CREATE command from the first node. In this example, the enterprise key management server 220 sends the key identification 404 to the first node.

At block 506, the first node is configured to generate a random alphanumeric string and sends the random alphanumeric string including an algorithm and the key identification to the enterprise key management server. For example, the first node generates the random alphanumeric string 314 such as a combination of different numbers or alphabets. In this example, the first node sends the random alphanumeric string 314 including the algorithm 406 and the key identification 404 to the enterprise key management server 220. The algorithm 406 can describe how the random alphanumeric string is to be encrypted by the enterprise key management server 220.

At block 508, the first node receives a cipher text including a key from the enterprise key management server. For example, the enterprise key management server 220 uses the key identification 404 to generate the key 310. In this example, the enterprise key management server 220 encrypts the random alphanumeric string 314 using the key 310 and the algorithm 406 to generate the cipher text 320. The cipher text 320 and the generated key 310 are communicated back to the first node by the enterprise key management server 220.

At block 510, the first node is configured to decrypt the received cipher text from the enterprise key management server with the use of the key. For example, the key 310 includes a symmetric encryption key. In this example, the first node may use the symmetric encryption key to decrypt the received cipher text 320. The decryption can use the algorithm 406 that is identified by the first node.

At block 512, the first node compares the decrypted cipher text with the random alphanumeric string generated by the first node at block 506. For example, the first node compares the decrypted cipher text with the alphanumeric string that the first node generated at block 506. In response to matching decrypted cipher text and alphanumeric string, and at block 514, the first node sends the key, cypher text, and the algorithm to the second node. At block 514, the received key 310 at the first node is authentic. For non-matching decrypted cipher text and alphanumeric string, and at block 516, the first node records an incorrect key received by the first node. The incorrect key can include incorrect key identification, invalid key value, or a combination thereof.

Turning to FIG. 6, the method 600 shows the verifying of the key at the second node. At block 602, the first node sends the cipher text including the key and the algorithm to the second node. For example and upon authentication of the key at the BMC 204, the BMC forwards the cipher text, the authenticated key, and the algorithm to the storage controller 206. At block 604, the second node decrypts the received cipher text using the received key and the algorithm. For example, the storage controller 206 decrypts the received cipher text 320 using the key 310 and the algorithm 406. The decryption of the cipher text generates a first decrypted value that is communicated by the storage controller 206 to the BMC 204. At block 606, the sending first node compares the first decrypted value with the alphanumeric string that the first node generated at block 506. In response to matching first decrypted value and alphanumeric string, and at block 608, the first node sends a first command to the second node. The first command can include use of the authenticated key by the second node. In various embodiments, the second node may apply the key to unlock or lock the self-encrypting drives. In other embodiments, the second node may use the key, received cipher text, and the algorithm, to perform another authentication of an immediate node in the data center. At block 610 and upon the authentication of the key that is received by the second node, the first node discards the key and the cipher text. In this regard, there is no need to verify the key on all previous nodes in the key traversal path after the authentication of the key in the immediate node such as the storage controller 206.

At block 612 and in response to non-matching first decrypted value and alphanumeric string, the first node records the detected incorrect key that is stored at the second node.

Turning to FIG. 7, the method 700 shows authentication of the key between the second node and a third node. At block 702, the second node sends the cipher text including the key, and the algorithm, to the third node. For example, the third node includes another storage controller or the self-encrypting drive. At block 704, the third node decrypts the received cipher text using the received key and the received algorithm. The decryption by the third node can result to a second decrypted value. For example, the self-encrypting drive such as the storage device 208 receives the cipher text 320, key 310, and the algorithm 406. In this example, the self-encrypting device decrypts the received cipher text 320 using the key 310 and the algorithm 406. At block 706, the transmitting second node compares the second decrypted value from the third node, and the first decrypted value at the second node. For example, the first decrypted value includes the random alphanumeric string. In response to matching second decrypted value and first decrypted value, and at block 708, the second node sends a second command to the third node to apply the key. For example, the third node such as the self-encrypting drive may apply the key for locking or unlocking. In another example, the third node may use the key, received cipher text, and the algorithm, to perform key authentication of another node in the data center. At block 710 and upon the key authentication at the third node, the second node discards the key and the cipher text.

At block 712 and in response to non-matching second decrypted value and first decrypted value, the second node records the detected incorrect key that is received by the third node.

What is claimed is:

1. An information handling system, comprising:
   a first node configured: to generate a random alphanumeric string; to receive a cipher text and a key from an enterprise key management server; and to decrypt the cipher text using the key and an algorithm to generate a first decrypted value, wherein the first node compares the random alphanumeric string with the first decrypted value to verify the key that is received at the first node;
   a second node configured to receive the cipher text, the key, and the algorithm from the first node in response to the first decrypted value matching the random alphanumeric string, wherein the second node decrypts the cipher text using the key and the algorithm to generate a second decrypted value, wherein the first node compares the second decrypted value with the random alphanumeric string to verify the key that is received at the second node; and
   a self-encrypting drive configured to receive the key from the second node in response to the second decrypted value matching the random alphanumeric string, wherein the self-encrypting drive utilizes the key upon authentication of the key by the second node.

2. The information handling system of claim 1, wherein the first node includes an integrated remote access controller (iDRAC) that receives a key request from the second node in a secure enterprise key manager solution.

3. The information handling system of claim 2, wherein the second node includes a storage controller that sends the key request to the iDRAC in response to a detection of the self-encrypting drive during a reboot of the information handling system.

4. The information handling system of claim 2, wherein the first node receives a key identification from the enterprise key management server in response to a sending of a create key command to the enterprise key management server.

5. The information handling system of claim 4, wherein the first node sends the create key command using a key management interface protocol (KMIP) CREATE command.

6. The information handling system of claim 4, wherein the key identification is utilized by the enterprise key management server to search a corresponding key value, and to generate the key based upon the key identification and the searched key value.

7. The information handling system of claim 1, wherein the second node is configured to authenticate the key at the self-encrypting drive by comparing the random alphanumeric string with a third decrypted value.

8. The information handling system of claim 7, wherein the self-encrypting drive is configured to: receive the cipher text, the key, and the algorithm from the second node; and to generate the third decrypted value by decrypting the cipher text using the key and the algorithm, wherein the received algorithm indicates the algorithm to be used for decryption.

9. The information handling system of claim 1, wherein the key includes a symmetric encryption key.

10. A method, comprising:
    generating, by a first node, a random alphanumeric string;
    receiving, by the first node, a cipher text and a key from an enterprise key management server;
    decrypting the cipher text using the key and an algorithm to generate a first decrypted value, wherein the first node compares the random alphanumeric string with the first decrypted value to verify the key that is received at the first node;
    receiving, by a second node, the cipher text, the key, and the algorithm from the first node in response to the first decrypted value matching the random alphanumeric string, wherein the second node decrypts the cipher text using the key and the algorithm to generate a second decrypted value;
    comparing, by the first node, the random alphanumeric string with the second decrypted value to verify the key that is received at the second node; and
    receiving, by a self-encrypting drive, the key from the second node in response to the second decrypted value matching the random alphanumeric string, wherein the self-encrypting drive uses the key upon authentication by the second node.

11. The method of claim 10, wherein the first node includes an integrated remote access controller (iDRAC) that receives a key request from the second node when the second node is in a secure enterprise key manager mode.

12. The method of claim 11, wherein the second node includes a storage controller that sends the key request to the iDRAC in response to a detection of the self-encrypting drive during a reboot of an information handling system.

13. The method of claim 12 further including a sending, by the first node, a create key command to the enterprise key management server.

14. The method of claim 13, wherein the create key command includes a key management interface protocol (KMIP) CREATE command.

15. The method of claim 10, wherein the key includes a symmetric encryption key.

16. The method of claim 15, wherein the algorithm uses the symmetric encryption key for encryption and decryption purposes.

17. The method of claim 10 further including: discarding by the first node of the cipher text and the key after verifying the received key at the second node.

18. A rack server, comprising:
    an enterprise key management server; and
    an information handling system coupled to the enterprise key management server, including:
    a first node configured: to generate a random alphanumeric string; to receive a cipher text and a key from the enterprise key management server;
    and to decrypt the cipher text using the key and an algorithm to generate a first decrypted value, wherein the first node compares the random alphanumeric string with the first decrypted value to verify the key that is received at the first node;
    a second node configured to receive the cipher text, the key, and the algorithm from the first node in response to the first decrypted value matching the random alphanumeric string, wherein the second node decrypts the cipher text using the key and the algorithm to generate a second decrypted value, wherein the first node compares the second decrypted value with the random alphanumeric string to verify the key that is received at the second node; and a storage device configured to receive the key from the second node in response to the second decrypted value matching the random alphanumeric string, wherein the storage device utilizes the key upon authentication of the key by the second node.

19. The rack server of claim 18, wherein the second node is configured to authenticate the key at the storage device by comparing the random alphanumeric string with a third decrypted value.

20. The rack server of claim 19, wherein the storage device is configured to: receive the cipher text, the key, and the algorithm from the second node; and to generate the third decrypted value by decrypting the cipher text using the key and the algorithm.

* * * * *